(12) United States Patent
Phillips

(10) Patent No.: US 6,474,285 B2
(45) Date of Patent: Nov. 5, 2002

(54) METHOD OF REPAIRING A DAMAGED SPARK PLUG HOLE

(76) Inventor: Tansil L. Phillips, Route 1, Box 101A, Halls, TN (US) 38040

( * ) Notice: Subject to any disclaimer, the term of this patent is extended or adjusted under 35 U.S.C. 154(b) by 52 days.

(21) Appl. No.: 09/789,384

(22) Filed: Feb. 23, 2001

(65) Prior Publication Data

US 2002/0117142 A1 Aug. 29, 2002

(51) Int. Cl.[7] .................................................. B23P 7/00
(52) U.S. Cl. .................................. 123/193.5; 29/402.17
(58) Field of Search .......................... 123/193.5, 169 R, 123/41.82 R; 29/402.01–402.17; 470/198

(56) References Cited

U.S. PATENT DOCUMENTS

| | | | |
|---|---|---|---|
| 2,795,221 A | * 6/1957 | Braendel | 123/169 R |
| 3,187,729 A | * 6/1965 | Morrison | 123/193.5 |
| 3,449,816 A | * 6/1969 | Swick et al. | 29/402.13 |
| 3,683,873 A | * 8/1972 | Tarter | 123/41.82 R |
| 3,694,838 A | * 10/1972 | Runton | 29/402.17 |
| 3,750,259 A | * 8/1973 | Timmons | 29/402.11 |
| 3,847,499 A | * 11/1974 | Heyworth et al. | 29/402.11 |
| 3,864,806 A | * 2/1975 | Hanson et al. | 29/402.17 |
| 5,842,924 A | * 12/1998 | Manos et al. | 470/198 |

* cited by examiner

Primary Examiner—Marguerite McMahon
(74) Attorney, Agent, or Firm—Wood, Phillips, Katz, Clark & Mortimer

(57) ABSTRACT

An inexpensive method for repairing a damaged spark plug hole of a cylinder engine includes drilling the damaged spark plug hole using a drill bit, tapping the drilled spark plug hole, threading a steel insert into the threaded hole and making a spark plug seat. The depth of the drilling, tapping and threading is limited by a stopper. A set of new tools are used to realize the foregoing process. All these procedures can be done while the cylinder having the damaged spark plug hole on the vehicle. The resulting hole is stronger and more durable than the original spark plug hole in the aluminum cylinder head.

12 Claims, 3 Drawing Sheets

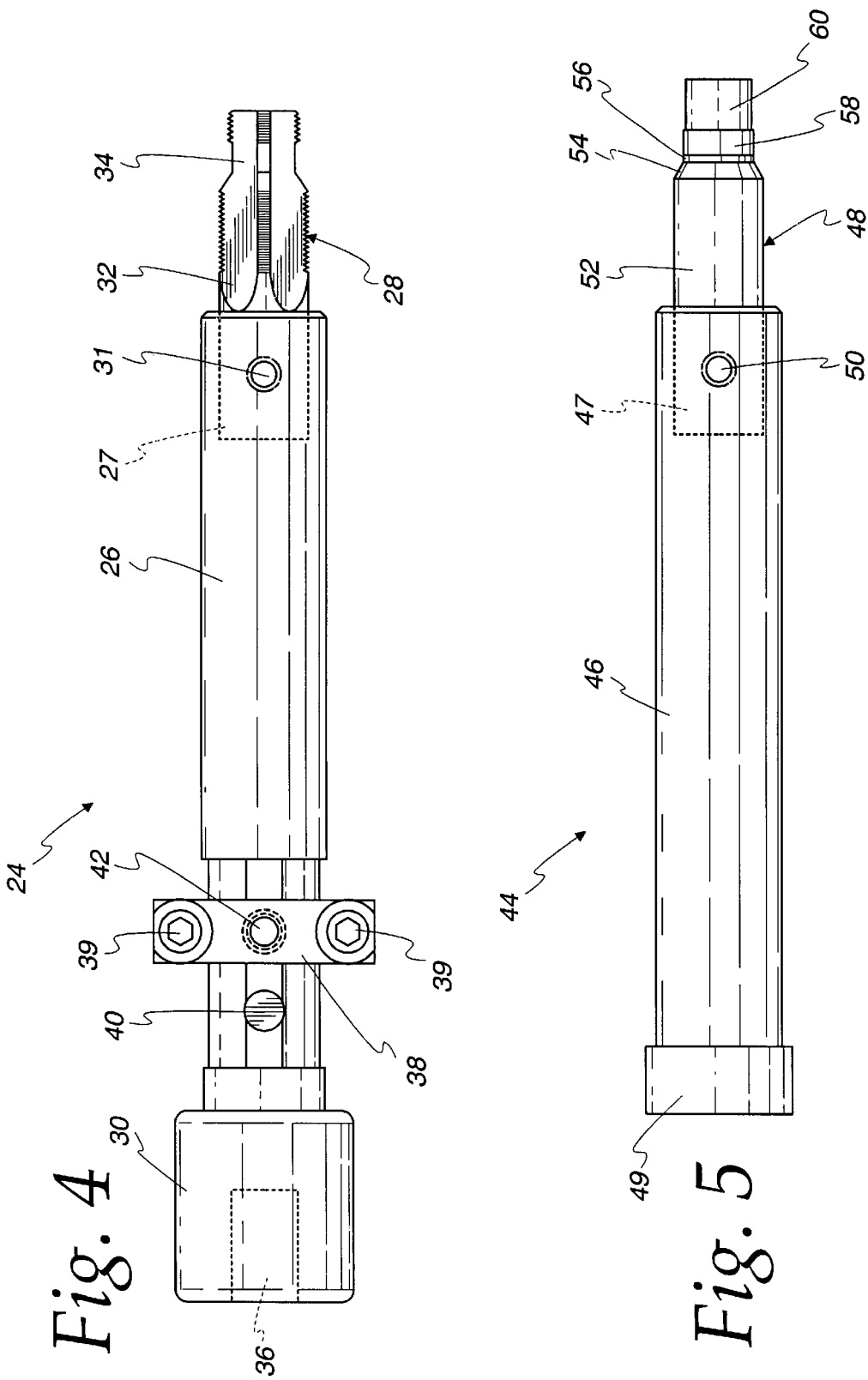

METHOD OF REPAIRING A DAMAGED SPARK PLUG HOLE

BACKGROUND OF THE INVENTION

Inquires have increased recently for repairing a damaged spark plug hole in an aluminum cylinder head of a vehicle engine. Most of the engines experiencing the problem have more than 80,000 miles on the vehicle. When the spark plug is removed in these high mileage engines for a tune-up the threads in the head may strip out as the plug is removed. This is due to carbon built up on the spark-plug threads.

In the past, there was no way of repairing the damaged spark plug hole. Therefore, the cylinder head had to be replaced if the spark plug hole was damaged. The cost of labor and total materials used for the head replacement can be more than two thousand dollars. It is very expensive and time consuming.

The present invention is directed to overcoming one or more of the above problems.

SUMMARY OF THE INVENTION

In accordance with the invention a new method is provided using new tools for repairing a damaged spark plug hole in a cylinder head of a vehicle engine. More specially, the repairing method uses a set of tools that would repair the damaged spark plug hole while the cylinder head having the damaged spark hole remains in the vehicle.

Additionally, a new structure of a spark plug hole is provided that is harder to damage and can be used for much longer time compared with the original spark plug hole.

An exemplary embodiment of the invention achieves the foregoing in a method including first drilling the damaged spark plug hole using a drill bit to provide a drilled hole. A stopper is used to limit the depth of the drill to prevent damaging a piston in a cylinder of the vehicle engine. Secondly, the drilled spark plug hole is tapped to provide a threaded hole with the stopper limiting the depth of the thread. Thirdly, a steel insert is threaded into the threaded hole with the stopper guiding the insert to a required depth. The insert is cylindrical having an outer threaded surface and an inner surface having a threaded portion. Finally, the insert is seated to make a spark plug seat.

In accordance with one aspect of the invention, a tapping and threading tool is used for tapping the drilled hole and threading the insert into the threaded hole.

In accordance with another aspect of the invention, a seating tool is used for seating the spark plug hole.

As a result of the foregoing repairing method, the damaged spark plug hole is repaired using much less labor hours and materials compared with the replacement of the cylinder head. The amount of money saved by this method compared with the head replacement is substantial.

The resulting repaired hole having a steel insert is stronger and more durable than the original spark plug hole in an aluminum cylinder head.

Other features and advantages will become apparent from the following specification taken in conjunction with the accompanying drawings.

DESCRIPTION OF THE DRAWINGS

FIG. 4 is a plane view of a tapping and threading tool in accordance to the invention;

FIG. 5 is a plane view of an insert in accordance to the invention;

DESCRIPTION OF THE PREFERRED EMBODIMENT

An exemplary embodiment of a set of tools for repairing a damaged spark plug hole 2 (shown in FIG. 1) in a cylinder head 4 of a vehicle engine is illustrated in FIGS. 2–5.

Figure 2:
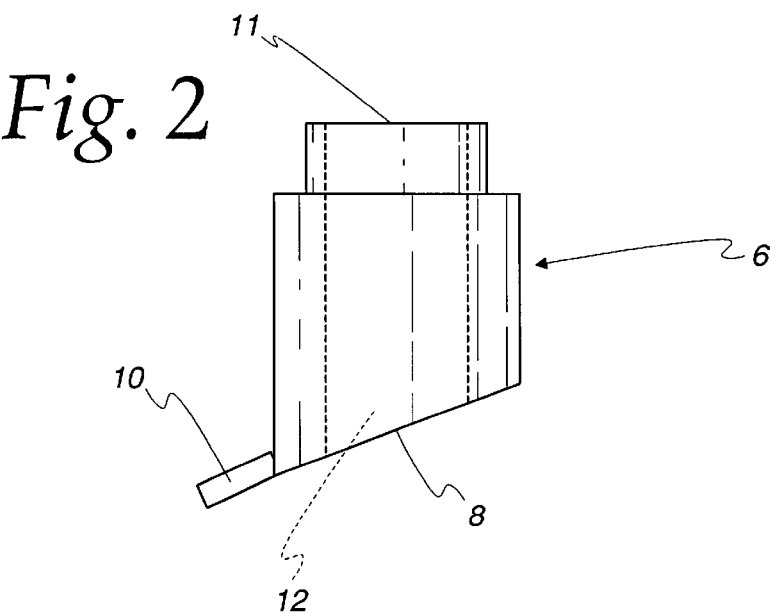
FIG. 2 is a plane view of a stopper in accordance to the invention.

Referring to FIG. 2, a stopper 6 is cylindrical having a bevel 8 with a small protruding ear 10 at one end and a horizontal surface 11 at another end. A cylindrical opening 12 extends through the stopper 6. The protruding ear 10 may be used as a handle.

Figure 3:
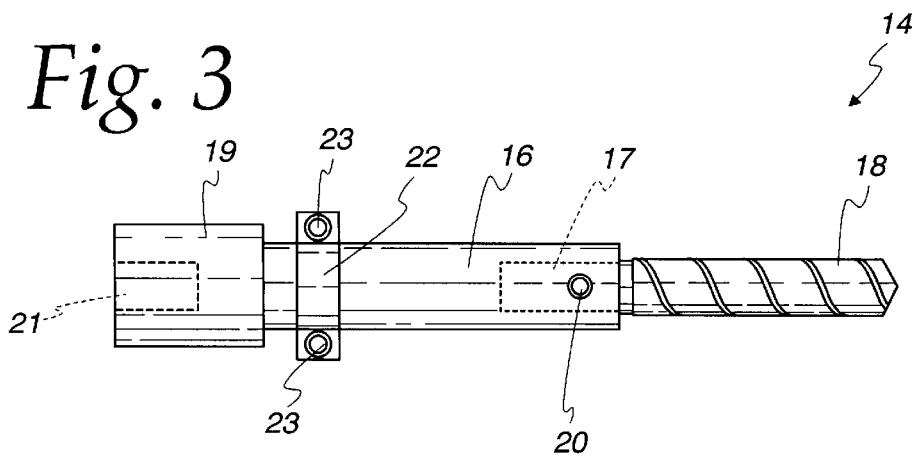
FIG. 3 is a plane view of a drilling adapter with a drill bit in accordance to the invention.

Referring now to FIG. 3, a drilling adapter 14 includes a shaft 16 having one end with an opening 17 receiving a drill bit 18 and another end connected to a short cylindrical block 19. A screw 20 fastens the drill bit 18 to the shaft 16. The short cylindrical block 20 has an opening 21 in which a rachet tool can fit. A shaft collar 22 is fixed around the shaft 16 at a selected place through screws 23.

A tapping and threading tool 24 is shown in FIG. 4. The tapping and threading tool 24 includes a shaft 26 having one end with an opening 27 receiving a modified cutter 28 and another end connected to a short cylindrical block 30. A screw 31 fastens the modified cutter 28 to the shaft 26. The modified cutter 28 has a wide threaded portion 32 proximate to the shaft 26 and a narrow distal threaded portion 34. The short cylindrical block 30 has an opening 36 in which a rachet tool can fit. There is a slip collar 38 that can slide up and down on the shaft 26 by loosening Allen screws 39 or the like. The slip collar 38 has two positions 40, 42 that can be obtained by fastening the screws 39. The tapping and threading tool 24 serves as a tapping tool when the slip collar 38 is secured at the first position 40 and a threading tool when the slip collar 38 is secured at the second position 42.

Referring to FIG. 5, a seating tool 44 includes a wide shaft 46, used as a handle, having one end with an opening 47 receiving a seating adapter 48 and another end connected to a head 49. A screw 50 fastens the seating adapter 48 to the shaft 46. The seating adapter 48 is generally cylindrical and has a wide near end, received in the opening 47, connected by a wide conical portion 54 to a narrow conical portion 56. The narrow conical portion 56 is connected at other end to a central portion 58. The central portion 58 is connected at a shoulder to a narrow distal end 60.

Figure 6:
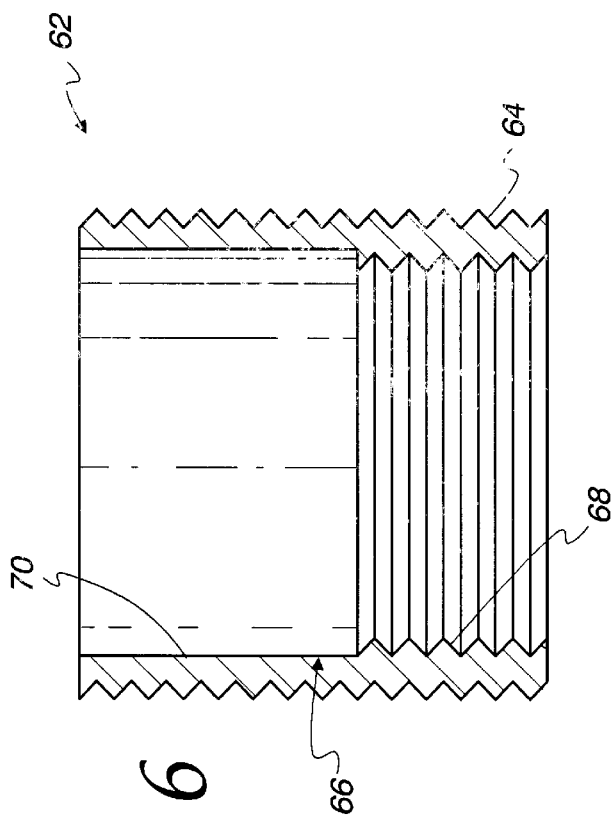
FIG. 6 is a plane view of a seating tool in accordance to the invention.

A steel insert 62 is shown in FIG. 6. The insert 62 is cylindrical having an outer threaded surface 64 and an inner surface 66 having a threaded portion 68 at one end and a smooth portion 70 at the other end.

Figure 1:
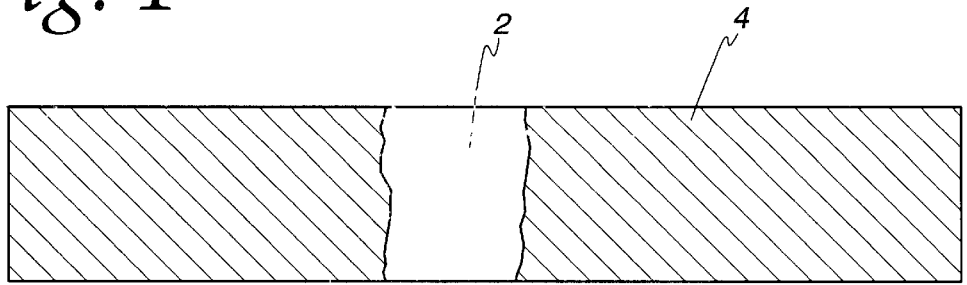
FIG. 1 is a sectional view of a damage spark plug hole in a cylinder head of a vehicle engine.

The above described tools of FIGS. 2–5 can be used to simply and inexpensively repair the damaged spark plug hole of FIG. 1.

Before repairing the damaged spark hole 2 shown in FIG. 1, the battery source should be disconnected from a vehicle. With the old spark plug removed the engine is rotated from the front crankshaft pulley until the piston begins to go down to provide enough work space for repairing the hole 2.

The repairing method first includes placing the stopper 6 on the cylinder head 4 and over the damaged spark plug hole 2 to be repaired. The bevel 8 of the stopper 6 lies facing down against the cylinder head 4. The drill bit 18 is sprayed heavily with a compound that allows some of the aluminum shavings to adhere to the drill bit 18 as it drills. The compound can be removed later when the drill bit 18 is removed. The compound may be, for example, Napa Tack Gasket. The drilling adapter 14 having the drill bit 18 is inserted through the opening 12 of the stopper 6 into the damaged spark plug hole 2. A rachet tool is inserted onto the opening 21 at the end of the drilling adapter 14 and turned until the drill bit 18 penetrates and completes drilling of the hole 2 and the drilling adapter 14 with its shaft collar 22 turns freely against the horizontal surface 11 of the stopper 6. The stopper 6 will not allow the drilling adapter 14 to enter the cylinder more than required. Then, the drilling adapter 14 is removed from the drilled hole.

The repairing method second includes positioning the slip collar 38 on the tapping and threading tool 24 in the first position 40 and securing it. With the stopper 6 still positioned over the drilled spark plug hole, the tapping and threading tool 24 is inserted through the opening 12 of the stopper 6 into the hole. The stopper 6 is not only a stop for the drilling adapter 14, but is also a depth gage for the tapping and threading tool 24. A rachet tool is inserted onto the opening 36 at the end of the tapping and threading tool 24 and turned until the slip collar 38 is snug with the horizontal surface 11 of the stopper 6. The wide threaded portion 32 of the modified cutter 28 completes tapping of the hole. The tapping and threading tool 24 is then removed.

During the process of drilling and tapping the hole, there may be some aluminum shavings enter the cylinder. Therefore, the cylinder may be cleaned after the hole is drilled and tapped. For example, a cloth sock is wrapped over a flexible shaft-shaped cleaner tool and secured. The cloth sock is sprayed with the compound like Napa Tack Gasket. The shaft-shaped cleaner tool having the cloth sock is inserted through the drilled and tapped hole to enter the cylinder where the shavings are located. The shaft-shaped cleaner tool is rotated. The shavings stick to the cloth sock when the shaft-shaped cleaner tool is rotated. Then, the shaft-shaped cleaner tool is pulled out from the hole. A clean cloth is used to wipe the shavings from the cloth sock. This procedure is repeated until all the shavings are removed.

Once the debris is removed from the cylinder, the repairing method thirdly includes installing the steel insert 62 onto the narrow threaded portion 34 of the modified cutter 28 of the tapping and threading tool 24. The insert 62 is finger tightened into place. A clean solution is used to clean the outside threads of the insert 62. Once cleaned, a locking compound, for example, Lock Tight 640, can be put on a plurality of threads to the center of the insert 62. The slip collar 38 on the tapping and threading tool 24 is now slipped in the second position 42 and secured. The tapping and threading tool 24 with the insert 62 on the narrow threaded portion 34 of the modified cutter 28 is inserted through the opening 12 of the stopper 6 into the drilled and tapped spark plug hole. At this time the tapping and threading tool 24 is turned by hand until against the stopper 6. A rachet tool is inserted onto the opening 36 at the end of the tapping and threading tool 24 and turned until the slip collar 38 is snug only against the horizontal surface 11 of the stopper 6. This positions the insert 62. With the locking compound, the insert 62 adheres to the threaded wall of the cylinder head 4. The tapping and threading tool 24 is then unscrewed and removed by using hand pressure. The stopper 6 is also removed at this time.

Finally, the repairing method includes inserting the seating tool 44 in the hole. The seating tool 44 is allowed to position itself in the insert 62. A small hammer is used to tap the end of the seating tool 44 until feeling secure and bottoming out. The narrow distal end 60 of the seating adapter 48 aligns itself in and with the threaded portion 68 of the inner surface 66 of the insert 62. The central portion 58 of the seating adapter 48 aligns itself in the smooth portion 70 of the inner surface 66 of the insert 62. When the seating tool 44 is knocked in, the narrow conical portion 56 of the seating adapter 48 forces the outer surface 64 of the insert 62 out into the threaded wall of the cylinder head 4. This allows a lock of the insert 62. The wide conical portion 54 of the seating adapter 48 makes a spark plug seat when the seating tool 44 is knocked inward. All these steps are done at the same time as the seating tool 44 is struck. This procedure ensures total and complete alignment when the spark plug is installed. Then the seating tool 44 is removed.

Figure 7:
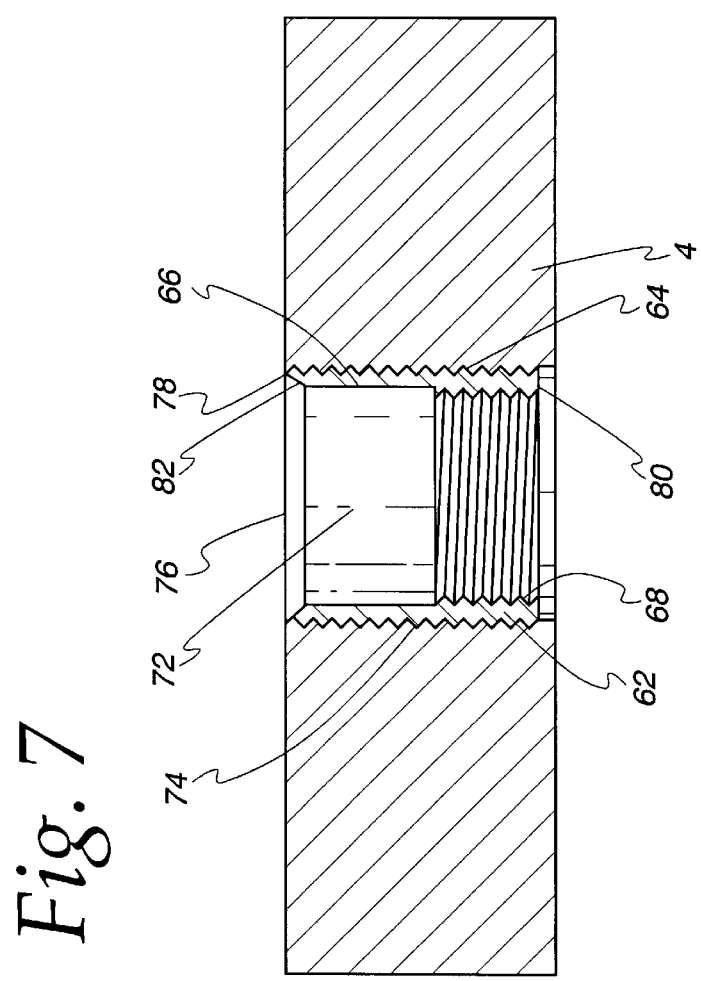
FIG. 7 is an enlarged, exploded fragmentary view of the repaired spark plug hole in accordance to the invention.

As shown in FIG. 7, the repaired spark plug hole includes a cylinder head 4 having a through cylindrical opening 72. The opening 72 has a threaded portion 74 from a near end 76 of the opening 72. The length of the threaded portion 76 of the opening 72 is less than that of the opening 72 itself. The metal insert 62 threaded in the threaded portion 74 of the opening 72 is cylindrical having a near end 78 and a far end 80. The length of the threaded outer surface 64 of the insert 62 is at most equaling to that of the threaded portion 74 of the opening 72. The inner surface 66 of the insert 62 has a threaded portion 68 proximate to the far end 80 of the insert 62. There is a conical seat 80 in the inner surface 66 at the near end of the insert 62 formed using the tapping and threading tool of FIG. 4 as described above.

The spark plug hole is now back to standard. Then a new spark plug can be installed.

I claim:

1. A method of repairing a damaged spark plug hole in a cylinder head of a vehicle engine, comprising the steps of:

(a) drilling the damaged spark plug hole using a drill bit to provide a drilled hole, a stopper limiting the depth of the drill to prevent damaging a piston in a cylinder of the vehicle engine;

(b) tapping the drilled spark plug hole to provide a threaded hole with the stopper limiting the depth of the thread;

(c) threading a insert into the threaded hole with the stopper guiding said insert to a required depth; and (d) seating the hole to make a spark plug seat.

2. The method of claim 1, wherein said insert being cylindrical having an outer threaded surface and an inner surface having a threaded portion for receiving a spark plug.

3. The method of claim 1, wherein said steps of tapping and threading are carried out with a tapping and threading tool comprising:

(a) a shaft; and (b) a cutter connected to one end of said shaft having one threaded portion with a first selected diameter corresponding to an outer diameter of said insert for tapping the hole and another threaded portion with a second selected diameter to which said insert is installed, said second selected diameter being less than said first selected diameter.

4. The method of claim 3 wherein said tapping and threading tool further comprises a slip collar that slides up and down on said shaft having a first position and a second position, said tapping and threading tool serving as a tapping tool when said slip collar securing at said first position and serving as a threading tool when said slip collar securing at said second position.

5. The method of claim 1, wherein said step of seating is carried out with a seating tool comprising:

(a) a handle; and (b) a conical portion connected to said handle to make the spark plug seat when said seating tool is knocked inward.

6. The method of claim 5 wherein said seating tool further comprises a cylindrical portion connected to said conical portion to align itself in the inner surface of said insert.

7. The method of claim 5 wherein said conical portion comprises:

(a) a first cone proximate to said handle to make the spark plug seat when said seating tool is knocked inward; and (b) a second cone at another end to force the outer surface of said insert into the threaded wall of the cylinder head to lock said insert when said seating tool is knocked in.

8. The method of claim 6 wherein said cylindrical portion comprises:

(a) a first distal cylindrical block to align itself in and with threaded portion of the inner surface of said insert; and (b) a second cylindrical block proximate to said conical portion to align itself in another portion of the inner surface of said insert.

9. In a vehicle engine having a cylinder head an improved spark plug hole, comprising:

(a) a through cylindrical opening of a first selected diameter in the cylinder head being a first selected length, said opening having a threaded portion being a second selected length from a near end of the opening, said second length being less than said first length; and (b) an insert threaded in the threaded portion of the opening being cylindrical having a near end and a far end, further comprising:

an outer threaded surface of the first selected diameter being a third selected length, said third selected length at most equaling to said second selected length;

an inner surface of a second selected diameter having a threaded portion proximate to the far end, said second selected diameter being less than said first selected diameter; and a conical seat in the inner surface at the near end.

10. The improved spark plug hole of claim 9 wherein said insert comprises a metal insert.

11. The improved spark plug hole of claim 9 wherein said insert is of a different material from the cylinder head.

12. A method of repairing a damaged spark plug hole in a cylinder head of a vehicle engine, comprising the steps of:

(a) placing a stopper on the cylinder head and over the damaged spark plug hole to be repaired;

(b) inserting a drilling adapter having a slip collar through said stopper in the damaged spark plug hole so that said drilling adapter will not be allowed by said stopper to enter the cylinder more than required and turning until freely against said stopper with its slip collar for penetrating and completing drilling of the spark plug hole;

(c) removing said drilling adapter from the drilled spark plug hole;

(d) inserting a tapping and threading tool through said stopper in the drilled spark plug hole and turning until stopped by said stopper to complete tapping of the spark plug hole;

(e) removing said tapping and threading tool from the tapped spark plug hole;

(f) installing a steel insert onto the end of said tapping and threading tool, said insert being cylindrical having an outer threaded surface and an inner surface having a threaded portion;

(g) inserting said tapping and threading tool through said stopper in the drilled and tapped spark plug hole and turning until stopped by said stopper to position said insert;

(h) removing said tapping and threading tool and said stopper from the spark plug hole;

(i) inserting a seating tool in the spark plug hole to position itself in said insert and tapping the end of said seating tool to make a spark plug hole; and (j) removing said seating tool from the repaired spark plug hole.

* * * * *